United States Patent [19]

Peters et al.

[11] 4,336,313
[45] Jun. 22, 1982

[54] LUMINESCENT MATERIAL, METHOD OF MAKING, AND SCREENS EMPLOYING SAME

[75] Inventors: Thomas E. Peters, Chelmsford; James R. McColl, Concord, both of Mass.

[73] Assignee: GTE Laboratories Incorporated, Waltham, Mass.

[21] Appl. No.: 251,028

[22] Filed: Apr. 3, 1981

[51] Int. Cl.$^3$ .................. C09K 11/44; C09K 11/24; H01J 29/20

[52] U.S. Cl. .................. 428/691; 252/301.6 F; 313/467

[58] Field of Search ............... 252/301.6 F; 428/691; 313/467

[56] References Cited

U.S. PATENT DOCUMENTS

| | | |
|---|---|---|
| 2,176,099 | 10/1939 | Pfanstiehl . |
| 2,238,026 | 4/1941 | Moore . |
| 2,247,192 | 6/1941 | Fonda . |
| 2,252,500 | 8/1941 | Fonda . |
| 2,537,262 | 1/1951 | Ellefson . |
| 2,554,999 | 5/1951 | Merrill et al. . |
| 2,615,850 | 10/1952 | McKeag .................. 252/301.6 F |
| 3,416,019 | 12/1968 | Kaduk . |
| 3,586,635 | 6/1971 | Vanik et al. . |
| 4,088,599 | 5/1978 | Suzuki et al. .................. 252/301.6 F X |

FOREIGN PATENT DOCUMENTS 544444 4/1942 United Kingdom ........ 252/301.6 F

OTHER PUBLICATIONS

Froelich et al., "J. Phys. Chem.", 46, pp. 878–885, 1942.
Gashurov et al., "J. Electrochem. Soc.", 114, pp. 378–381, 1967.
Von K.-Th. Wilke, "Zeitschrift Fur Physikalische Chemie", 224, pp. 51–56, 1963.

*Primary Examiner*—Jack Cooper
*Attorney, Agent, or Firm*—Jerry F. Janssen

[57] ABSTRACT

Luminescent materials comprising solid solutions of lithium zinc fluoride and zinc silicate activated with manganese and, optionally, arsenic having improved brightness, persistence, and crystallinity over prior art P-1 or P-39 phosphors are disclosed.

A method of formulating these phosphors, and cathodoluminescent screens employing these phosphors are also disclosed.

8 Claims, 4 Drawing Figures

LUMINESCENT MATERIAL, METHOD OF MAKING, AND SCREENS EMPLOYING SAME

CROSS-REFERENCE TO RELATED APPLICATIONS

Co-pending U.S. patent application Ser. No. 216,595 filed Dec. 16, 1980, and assigned to the present assignee is directed to manganese and arsenic co-activated zinc silicate cathodoluminescent materials modified by the addition of small amounts of an alkali metal salt to improve persistence.

BACKGROUND OF THE INVENTION

This invention relates to luminescent materials. More particularly, it is concerned with luminescent phosphors comprising a solid solution of zinc silicate and lithium zinc fluoride, a method of producing such phosphors, and cathodoluminescent screens employing such phosphors.

Manganese activated zinc silicate is a well known green-emitting cathodoluminescent phosphor identified commercially as type P-1. When manganese is incorporated into zinc silicate, the resulting phosphor is often off-white or dark in appearance. A white-bodied manganese-activated zinc silicate phosphor can be obtained by employing excess silica over the amount stoichiometrically required, as taught by U.S. Pat. No. 2,254,414 to Roberts, or by incorporating small amounts of magnesium ion in the zinc silicate lattice as disclosed in U.S. Pat. No. 3,416,019 to Kaduk.

Type P-1 phosphors, however, are generally characterized by rapid fluorescence decay and can exhibit the undesirable visual effect of flicker when used in such applications as cathode ray display tubes operated at low refresh rates. To increase the persistence of manganese activated zinc silicate phosphors, small amounts of arsenic are added as taught by U.S. Pat. No. 2,554,999 to Merrill et al. Arsenic-containing manganese activated zinc silicate phosphors are identified commercially as type P-39.

While persistence in P-39 phosphors generally increases with increasing arsenic content, it does so at the expense of brightness. Small increases in arsenic content will often produce appreciable losses in brightness. Thus, in producing P-39 phosphors, the attempt is made to effect a compromise between improved persistence on the one hand, and diminished brightness on the other. Rigorous control of arsenic content of P-39 phosphors during formulation is often difficult, however, owing to the tendency of arsenic compounds to volatilize from the mixture during the repeated high temperature firings required to produce zinc silicate.

Zinc silicate is usually synthesized by a solid-state reaction between $ZnO$ or $ZnCO_3$ and silicic acid. Typically, as when zinc silicate phosphors are prepared, the reaction between the thoroughly blended dry ingredients is carried out at 1200° C. for aobut 2 hours. Zinc silicate prepared by such methods consists of irregularly shaped, often agglomerated and inter-grown particles ranging from less than 1 $\mu m$ to several $\mu m$ in size. The material generally contains a considerable non-crystalline component and the particles show no well-developed faces.

To facilitate the formation of zinc silicate phosphors, it has been the practice to employ alkali metal or alkaline earth metal salts as fluxes as taught by U.S. Pat. No. 2,247,192 to Fonda. The use of such fluxes is not desirable, however, because of the tendency of these metals to form silicates or to quench the beneficial effect of extended fluorescence conferred by the incorporation of arsenic [see for example, Froelich et al. in J. Phys. Chem., 46: 878–885 (1942)].

It is believed therefore, that a green-emitting zinc silicate-based phosphor having enhanced brightness, crystallinity, and uniformity of particle size would be an improvement in the art.

OBJECTS AND SUMMARY OF THE INVENTION

It is an object of the invention to provide an improved cathodoluminescent material having its primary emission in the range from about 500 nanometers to about 550 nanometers.

It is another object of the invention to provide a green-emitting phosphor having enhanced brightness over prior art manganese activated zinc silicate phosphors.

It is a further object of the invention to provide a green-emitting phosphor containing zinc silicate having improved crystallinity and uniformity of particle size.

It is an additional object of the invention to provide a method of preparing green-emitting manganese activated zinc silicate-containing phosphors having enhanced brightness and improved crystallinity.

It is still another object of the invention to provide an improved cathodoluminescent screen.

These and other objects are achieved in accordance with one aspect of the invention wherein there is provided a green-emitting phosphor comprising a solid solution of zinc silicate and lithium zinc fluoride activated with manganese and optionally including up to 0.2 atom percent arsenic. These phosphors exhibit cathodoluminescence in the range from about 500 nanometers to about 550 nanometers.

In accordance with another aspect of the invention, a method of preparing luminescent phosphors comprises the steps of dry-blending finely divided zinc oxide and silicic acid in approximately 2:1 molar ratio; adding aqueous solutions of a manganous salt and, optionally an oxide of arsenic, to the dry blend of zinc oxide and silicic acid and thereafter drying; pre-firing the resulting mixture at a temperature between about 800° C. and 1000° C. for a period sufficient to decompose the silicic acid; comminuting the pre-fired mixture and adding an approximately 2:1 molar ratio mixture of lithium fluoride and zinc fluoride; and firing the resulting mixture in a non-oxidizing gas atmosphere at a temperature of between about 650° C. to about 1000° C. for a period sufficient to form a phosphor comprising a solid solution of zinc silicate and lithium zinc fluoride.

In an additional aspect of the present invention, a cathodoluminescent screen utilizing the foregoing green-emitting phosphor provides a screen having improved brightness, screenability, and wet strength.

For a better understanding of the present invention, together with other and further objects, advantages and capabilities thereof, reference is made to the following disclosure and appended claims in connection with the above-described drawing.

DETAILED DESCRIPTION

Figure 3:
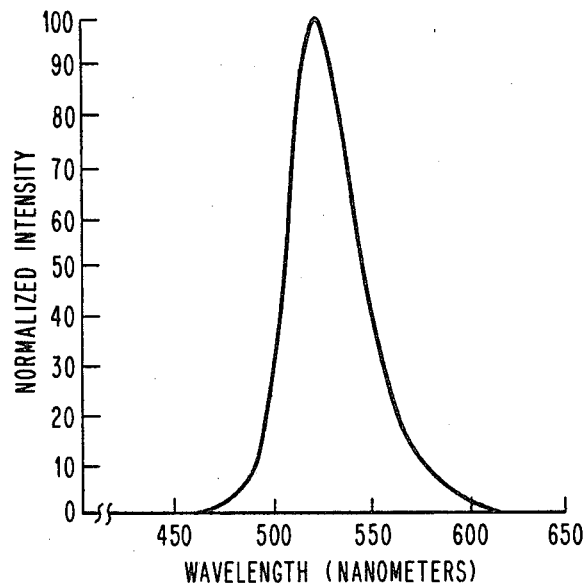
FIG. 3 is a typical emission spectrum of phosphors in accordance with one aspect of the present invention.

Phosphors in accordance with one aspect of the present invention comprise a host matrix consisting essentially of zinc silicate and lithium zinc fluoride ($Li_2ZnF_4$) activated with manganese and optionally containing arsenic in an amount of up to about 0.2 atom percent. These phosphors exhibit enhanced brightness over prior art manganese activated zinc silicate phosphors, and are well-crystallized materials of uniform particle size. The phosphors are green-emitting luminescent materials having an emission band peaking at about 523 nanometers as illustrated by the emission spectrum presented in FIG. 3.

Figure 2:
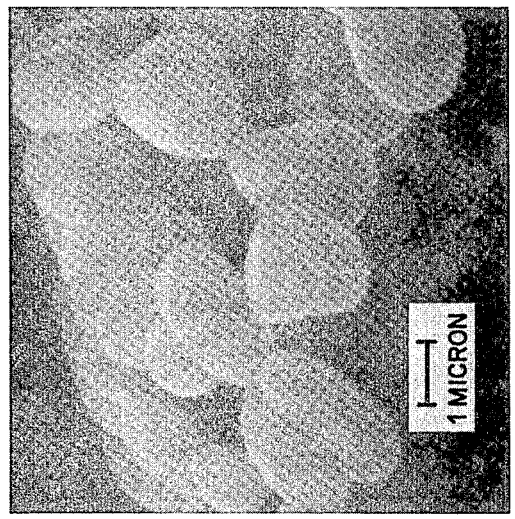
FIG. 2 is a scanning electron micrograph of a prior art P-39 phosphor at the same magnification as that of FIG. 1.
Figure 1:
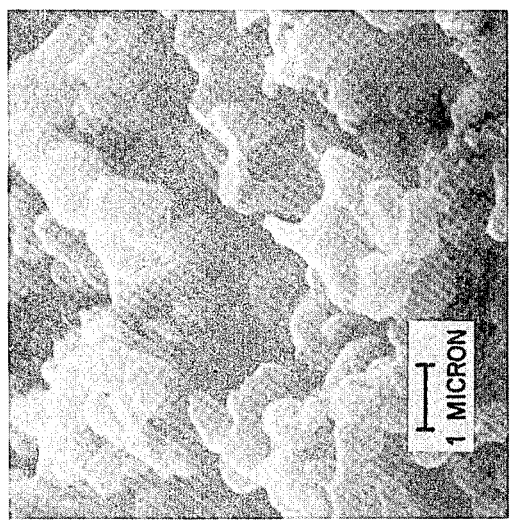
FIG. 1 is a scanning electron micrograph of a phosphor in accordance with one aspect of the invention.

It has been found in accordance with the present invention that addition of both lithium fluoride and zinc fluoride to zinc silicate during the formulation of these phosphors results in a material which comprises a solid solution of lithium zinc fluoride in zinc silicate. Lithium fluoride and zinc fluoride are added to the pre-fired phosphor mixture in an approximately 2:1 molar ratio and in a combined amount which ranges from about 2 mole percent to about 20 mole percent of the total mixture. After firing, the above mixture results in a green-emitting luminescent material having brightness, crystallinity, and uniformity of particle size superior to known prior art P-1 or P-39 phosphors. As can be seen in FIG. 1, where there is shown a micrograph of a phosphor in accordance with the present invention, the crystallites exhibit well-developed faces and uniform particle size. For purposes of comparison, FIG. 2 presents a micrograph of a typical prior art type P-39 phosphor, taken at the same magnification.

Phosphors of the present invention contain from about 0.1 atom percent to about 12 atom percent manganese and, optionally, up to about 0.2 atom percent arsenic. These phosphors can be conveniently represented by the formula:

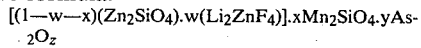
$[(1-w-x)(Zn_2SiO_4).w(Li_2ZnF_4)].xMn_2SiO_4.yAs_2O_z$ where w ranges between 0.02 and 0.20, x ranges between about 0.0005 and 0.06, y may take on a value of up to about 0.001, and z ranges from 3 to 5. The arsenic may be added to the prefired phosphor blend as arsenic trioxide, arsenic pentoxide, or a compound of arsenic thermally decomposable to arsenic oxide. The exact oxidation state of arsenic in the fired phosphor compositions of this invention is unknown. Phosphors of the above formulation wherein the value of y is nominally zero (that is, arsenic-free), correspond to type P-1 phosphors, but exhibit cathodoluminescent brightness and crystallinity superior to known prior art P-1 phosphors.

Phosphors of the above formulation which contain arsenic, that is, when y takes on a non-zero value up to the preferred maximum of about 0.001, correspond to phosphors of the P-39 type. In addition to the enhanced brightness, crystallinity, and uniformity of particle size conferred upon the modified P-39 phosphors of this invention by the inclusion of lithium zinc fluoride in the host matrix, these phosphors also exhibit persistence equal to or exceeding known prior art P-39 phosphors.

Phosphors in accordance with the invention are excited to luminescence by either short wavelength ultraviolet light or by electron impact. In the case of photoluminescence, brightness appears to increase with increasing manganese content. However, for the same phosphors, cathodoluminescence first increases with increasing manganese content and then decreases, with an accompanying decrease in persistence, at higher manganese concentrations. Thus, manganese concentrations of from about 0.1 atom percent to about 1 atom percent are preferred for phosphors of this invention employed as cathodoluminescent materials. However, for phosphor compositions employed as photoluminescent materials, as for example in fluorescent tube applications, higher concentrations of manganese, up to about 12 atom percent, are used.

In accordance with another aspect of the present invention, a method is provided for preparing green-emitting manganese activated phosphors containing zinc silicate and lithium zinc fluoride. Finely divided zinc oxide, or a compound thermally decomposable to zinc oxide such as the carbonate or acetate, is thoroughly mixed by dry-blending with silicic acid in an approximatly 2:1 molar ratio. To this mixture are next added between about 0.1 mole percent and about 12 mole percent of a manganese compound thermally decomposable to manganese oxide. Optionally, up to about 0.2 atom percent arsenic is added in the form of arsenic trioxide, arsenic pentoxide, or a compound thermally decomposable to arsenic oxide. Because of the small amounts of manganese and arsenic activators required for the formulation, they are conveniently added as aqueous solutions. The concentration of such solutions can be carefully controlled and small aliquots of the solutions are easily measured with accuracy. Manganese sulfate, arsenic trioxide and arsenic pentoxide are preferred materials.

The resulting slurry is dried and then pre-fired in air, preferably in a covered crucible, at temperatures between about 800° C. and 1000° C. for a period sufficient to decompose the silicic acid. Pre-firing times of from about one to two hours are sufficient.

The pre-fired cake is pulverized and then thoroughly mixed by dry milling with an approximately 2:1 molar ratio mixture of lithium fluoride and zinc fluoride. The two fluorides are added in an amount to constitute from about 2 mole percent to about 20 mole percent of the total mixture.

The thoroughly blended mixture is then fired at temperatures of between about 600° C. to about 1000° C. under a non-oxidizing gas atmosphere, preferably nitrogen. Temperatures of between about 800° C. and about 950° C. are preferred. This second firing step is carried out for a period sufficient to form a solid solution of zinc silicate and lithium zinc fluoride, usually for about 1 to 2 hours.

The final phosphor material is well crystallized, showing highly developed faces on the individual particles. The x-ray diffraction pattern of the material shows only a single phase, with the pattern being consistent with that of willemite. The structural similarity of zinc silicate and lithium zinc fluoride permits the formation of a solid solution of the two. Activation with manganese, or with manganese and arsenic produces cathodoluminescent phosphors with the same emission as known prior art P-1 or P-39 type phosphors, but having improved brightness, persistence, crystallinity and uniformity of particle size.

In the accompanying Table, the composition, brightness, and persistence of several phosphors of the present invention are compared with similar data for phosphors containing only lithium fluoride or zinc fluoride added, and prior art phosphors. The brightness and persistence data were obtained by coating each phosphor sample on a glass plaque and pulse exciting the phosphor by irradiation with a 30 pps electron beam having a dwell time of 0.5 microseconds. The brightness of each sample was normalized by adjusting the electron beam current so that a commercial sample of a P-39 phosphor had a measured luminance of 5 foot-lamberts under the given conditions. The brightness of each sample was then obtained at this beam current by means of a spot photometer.

The persistence data for each example in the Table are presented both in terms of a "ripple ratio" and percent initial luminance remaining 30 msec after excitation. The ripple ratio is the ratio of the variation in brightness of the phosphor to its average brightness under conditions of repeated and periodic pulse excitation. A lower ripple ratio indicates greater persistence. This measure of persistence best reflects the effect of fluorescence decay upon the visual perception of flicker in phosphor applications such as data display tubes operated at low refresh rates.

spond while exhibiting comparable or increased persistence.

The phosphors of examples VI and VII having zinc fluoride or lithium fluoride additions, are both brighter than the prior art P-39 phosphor of example IX to which they correspond; however, these materials did not exhibit the degree of crystallinity of examples I–V, and example VII containing lithium fluoride as the only additive has much higher ripple and lower persistence than the corresponding prior art P-39 phosphor of example IX.

The data of examples I–V indicate a trend toward lower brightness and persistence as the concentration of lithium zinc fluoride increases. Thus, for phosphors of this aspect of the invention, lithium zinc fluoride levels from about 2 mole percent to about 20 mole percent are preferred, with a maximum value of about 10 mole percent being most preferred.

In another aspect of the present invention, there are provided cathodoluminescent screens comprising a layer of a green-emitting cathodoluminescent phosphor deposited on a substrate, wherein the phosphor comprises a material corresponding to the general formula $$[(1-w-x)(ZnSiO_4) \cdot w(Li_2ZnF_4)] \cdot xMn_2SiO_4 \cdot yAs_2O_z$$

where w ranges from about 0.02 to about 0.20, x ranges

TABLE

| | [(1-w-x) (Zn$_2$SiO$_4$) · w(Li$_2$ZnF$_4$)] · xMn$_2$SiO$_4$ · yAs$_2$O$_z$ | | | | | |
|---|---|---|---|---|---|---|
| EXAMPLE | w | x | y | RELATIVE[1,2] BRIGHTNESS | RIPPLE RATIO | PERSISTENCE[3] |
| I | 0.05 | 0.002 | 0.0002 | 141 | 0.390 | 32.0 |
| II | 0.10 | 0.002 | 0.0002 | 122 | 0.366 | 34.5 |
| III | 0.15 | 0.002 | 0.0002 | 120 | 0.615 | 16.5 |
| IV | 0.10 | 0.020 | 0 | 119 | 0.813 | 6.3 |
| V | 0.10 | 0.010 | 0 | 116 | 0.818 | 6.8 |
| VI | 0.1 (ZnF$_2$ only) | 0.002 | 0.0002 | 111 | 0.342 | 37.0 |
| VII | 0.2 (LiF only) | 0.002 | 0.0002 | 145 | 0.576 | 18.5 |
| VII[4] | — | — | 0 | 100 | 0.832 | 5.9 |
| IX[5] | — | — | — | 100 | 0.358 | 34.5 |

NOTES
[1]The relative brightness values of examples I–III are compared with that of example IX, a commercial prior art P-39 phosphor assigned an arbitrary brightness of 100.
[2]The relative brightness values of examples IV and V are compared with that of example VIII, a commercial prior art P-1 phosphor assigned an arbitrary brightness of 100.
[3]Persistence values are percent initial brightness remaining 30 msec after initial excitation.
[4]A commercial prior art P-1 phosphor.
[5]A commercial prior art P-39 phosphor.

Examples I–III of the Table are manganese and arsenic co-activated phosphors in accordance with the invention which incorporate various amounts of lithium zinc fluoride. Examples IV and V are phosphors in accordance with the present invention which incorporate lithium zinc fluoride, but are activated with manganese alone. Examples VI and VII are manganese and arsenic co-activated zinc silicate phosphors containing relatively large amounts of zinc fluoride alone (Example VI) or lithium fluoride alone (Example VII) characteristic of prior art P-39 phosphors which use these materials as fluxes to facilitate the normally sluggish reaction to form zinc silicate. Examples VIII and IX are commercial P-1 and P-39 phosphors, respectively, used as comparative standards for brightness and persistence data presented in the Table.

As can be seen by the data presented in the Table, examples I–V, representing phosphors of this invention, show brightness levels 16% to 41% greater than prior art type P-1 or P-39 phosphors to which they correspond from about 0.0005 to about 0.06, y ranges up to about 0.001, and z ranges from 3 to 5.

Figure 4:
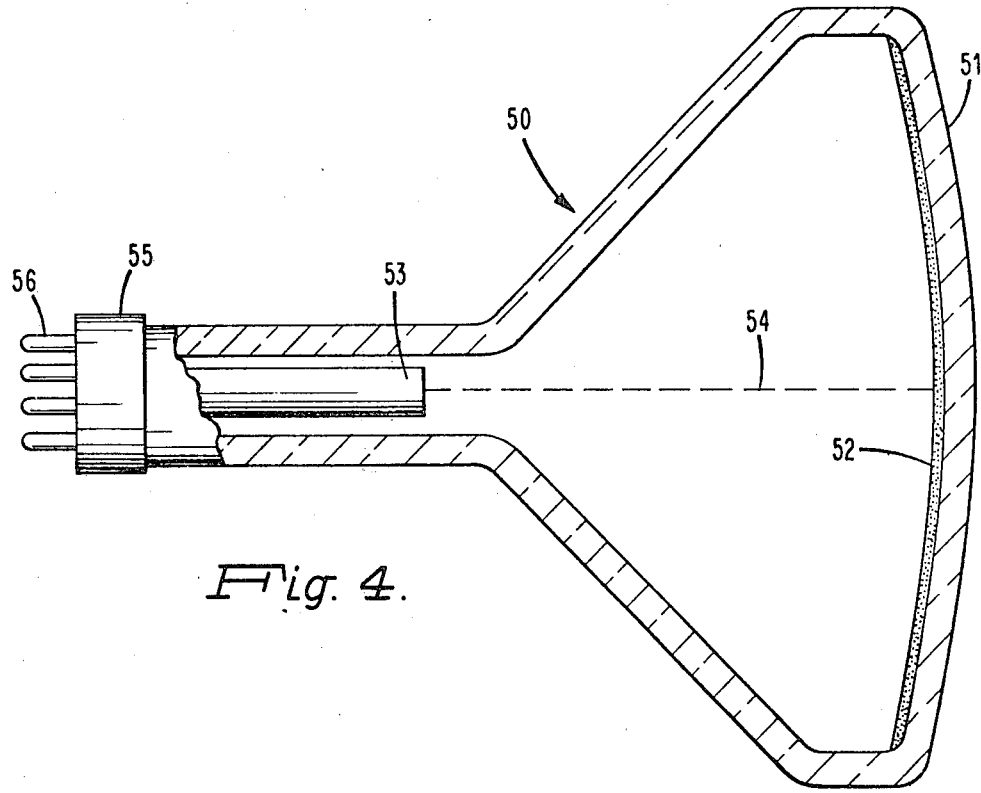
FIG. 4 is a sectioned lateral view of a cathode ray tube employing a cathodoluminescent screen in accordance with one aspect of the present invention.

In FIG. 4 there is shown in schematic cut-away cross-section, a cathode ray tube 50 having a transparent faceplate 51 on the inner surface of which is deposited a phosphor screen 52 in accordance with this aspect of the invention. The phosphor screen is excited to luminescence by electron beam 54 which is produced by gun assembly 53. The tube 50 is sealed by means of cap 55 having electrical connections 56 for connection to an electrical circuit.

The greater degree of phosphor crystallinity and uniformity of particle size confer improved screenability and "re-wet strength" on screens of this aspect of the invention over prior art P-1 or P-39 zinc silicate phosphors having poor crystallinity and particle agglomeration. Re-wet strength is the term given in the art to the resistance of a dry screen, deposited on the inner surface of a CRT tube faceplate during one step of fabrication, to disruption when re-wetted in preparation to application of a coat of lacquer and aluminum in subsequent steps.

To more fully illustrate the subject invention, the following detailed examples are presented. The examples are, however, to be viewed as illustrative of the invention and not to limit the scope thereof as defined by the appended claims.

Examples I-IX below detail the source or method of preparation of the phosphors for which data appear in the Table above. Examples I-V illustrate the preparation of phosphors of the present invention; Examples VI and VII illustrate the preparation of zinc silicate phosphors containing only lithium fluoride or zinc fluoride. Example VIII is a commercially obtained P-1 phosphor, and Example IX is a commercially obtained P-39 phosphor.

EXAMPLE I

Zinc oxide (9.26 g, 0.113 mole) and silicic acid (3.85 g, 0.049 mole) were thoroughly blended. To this mixture were added 3.2 ml of a 0.066 molar aqueous solution of $MnSO_4.H_2O$ (0.0002 mole) and 3 ml of a $7 \times 10^{-3}$ molar aqueous solution of $As_2O_3$ (0.00002 mole). The resulting slurry was dried and then fired in air in a closed quartz crucible at 870° C. for 1 hour. The resulting cake was pulverized and then dry milled with 0.31 g (0.003 mole) of zinc fluoride and 0.15 g (0.006 mole) of lithium fluoride. The resulting mixture was then fired under nitrogen at 950° C. for one hour. The fired product was pulverized and sieved through a 325 mesh screen and tested for brightness and persistence.

EXAMPLE II

Zinc oxide (29.24 g, 0.359 mole), silicic acid (12.16 g, 0.156 mole), 10 ml of $7 \times 10^{-3}$ molar aqueous $As_2O_3$ solution (0.00007 mole) and 10.6 ml of 0.066 molar aqueous $MnSO_4$ solution (0.0011 mole) were mixed and then fired at 870° C. for 1 hour as detailed in Example I. Zinc fluoride (2.10 g, 0.020 moles) and lithium fluoride (1.05 g, 0.040 moles) were added and the mixture refired at 950° C. for 1 hour under nitrogen. The resulting phosphor was pulverized and sieved through a 325 mesh screen and evaluated for brightness and persistence.

EXAMPLE III

Zinc oxide (8.28 g, 0.10 mole), silicic acid (3.44 g, 0.04 moles), $MnSO_4.H_2O$ (0.0002 mole), $As_2O_3$ ($2 \times 10^{-5}$ mole), $ZnF_2$ (0.92 g, 0.009 mole) and LiF (0.46 g, 0.018 mole) were treated as detailed in Examples I and II above to produce a phosphor.

EXAMPLE IV

Zinc oxide (8.69 g, 0.11 mole), silicic acid (3.65 g, 0.047 mole), and manganese carbonate (0.14 g, 0.0012 mole) were thoroughly blended and fired at 870° C. for 1 hour. The resulting cake was pulverized and thoroughly mixed with 0.30 g (0.012 mole) of lithium fluoride and 0.61 g (0.006 mole) of zinc fluoride. The resulting mixture was fired for 1 hour at 950° C. in a nitrogen atmosphere.

EXAMPLE V

Zinc oxide (8.74 g, 0.11 mole), silicic acid (3.65 g, 0.047 mole), 9.1 ml of 0.066 molar aqueous manganese sulfate (0.0006 moles), 0.28 g (p.01 mole) of lithium fluoride, and 0.56 g (0.005 mole) of zinc fluoride were treated by the process detailed in Example I.

EXAMPLE VI

A sample of phosphor was prepared in accordance with Example II above, but excluding lithium fluoride from the composition.

EXAMPLE VII

A sample of phosphor was prepared in accordance with Example II above, but excluding zinc fluoride from the composition.

While there have been shown and described what are at present considered to be the preferred embodiments of the invention, it will be obvious to those skilled in the art that various changes and modifications may be made therein without departing from the scope of the invention as defined by the appended claims.

What is claimed is:

1. A green-emitting phosphor having a composition corresponding to the general formula:

$$[(1-w-x)(Zn_2SiO_4).w(Li_2ZnF_4)].xMn_2SiO_4.yAs_2O_z$$

wherein $0.02 \leq w \leq 0.20$ $0.0005 \leq x \leq 0.06$ $0 \leq y \leq 0.001$ $3 \leq z \leq 5.$ 2. A phosphor in accordance with claim 1 wherein $0.02 \leq w \leq 0.10$.

3. A phosphor in accordance with claim 1 having primary luminescent emission in the range from about 500 nanometers to about 550 nanometers.

4. A method of preparing a green-emitting zinc silicate containing phosphor exhibiting a high degree of crystallinity having a composition corresponding to the general formula:

$$[(1-w-x)(Zn_2SiO_4).w(Li_2ZnF_4)].xMn_2SiO_4.yAs_2O_z$$

wherein $0.02 \leq w \leq 0.20$ $0.0005 \leq x \leq 0.06$ $0 \leq y \leq 0.001$ $3 \leq z \leq 5$ comprising the steps of:
(a) dry-blending finely divided zinc oxide and silicic acid in approximately 2:1 molar ratio;
(b) adding compounds of manganese and, optionally, arsenic that are thermally decomposable to manganese oxide and arsenic oxide, respectively;
(c) pre-firing the resulting mixture in air at a temperature between about 800° C. and 1000° C. for a period sufficient to decompose the silicic acid;
(d) comminuting the pre-fired mixture and adding an approximately 2:1 molar ratio mixture of lithium fluoride and zinc fluoride; and then
(e) firing the mixture in a non-oxidizing gas atmosphere at a temperature between about 600° C. and 1000° C. for a period sufficient to form a solid solution of lithium zinc fluoride in zinc silicate.

5. A method in accordance with claim 4 wherein said compounds of manganese and of arsenic are added in aqueous solutions to the dry blended mixture of zinc oxide and silicic acid.

6. A cathodoluminescent screen comprising a substrate and a thin film of green-emitting phosphor deposited thereon, said green-emitting phosphor comprising a material corresponding to the general formula $$[(1-w-x)(Zn_2SiO_4) \cdot w(Li_2ZnF_4)] \cdot xMn_2SiO_4 \cdot yAs_2O_z$$

wherein $0.02 \leq w \leq 0.20$ $0.0005 \leq x \leq 0.06$ $0 \leq y \leq 0.001$ $3 \leq z \leq 5.$ 7. A cathodoluminescent screen in accordance with claim 6 wherein $0.02 \leq w \leq 0.10$.

8. A cathodoluminescent screen in accordance with claim 6 having primary emission at between about 500 nanometers and about 550 nanometers.

* * * * *